United States Patent
Gizzatov et al.

(10) Patent No.: US 12,435,623 B2
(45) Date of Patent: Oct. 7, 2025

(54) PARTIALLY DEGRADABLE PARTICULATES AS TIME-RELEASED TRACERS FOR ACIDIZED AND FRACTURED GAS WELLS

(71) Applicant: SAUDI ARABIAN OIL COMPANY, Dhahran (SA)

(72) Inventors: Ayrat Gizzatov, Winchester, MA (US); Shitong Sherry Zhu, Waban, MA (US); Amy J. Cairns, Houston, TX (US); Rajesh Kumar Saini, Cypress, TX (US); Mohammed Sayed, Katy, TX (US); Wei Wang, Quincy, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/597,332

(22) Filed: Mar. 6, 2024

(65) Prior Publication Data
US 2024/0209729 A1 Jun. 27, 2024

Related U.S. Application Data

(62) Division of application No. 17/815,379, filed on Jul. 27, 2022, now abandoned.

(51) Int. Cl.
*E21B 47/11* (2012.01)
*C09K 8/66* (2006.01)
(Continued)

(52) U.S. Cl.
CPC .............. *E21B 47/11* (2020.05); *C09K 8/665* (2013.01); *C09K 8/88* (2013.01); *E21B 43/267* (2013.01)

(58) Field of Classification Search
None
See application file for complete search history.

(56) References Cited

U.S. PATENT DOCUMENTS

| 4,264,329 A | 4/1981 | Beckett |
| 5,111,882 A | 5/1992 | Tang et al. |
(Continued)

FOREIGN PATENT DOCUMENTS

WO   2019058098 A1   3/2019

OTHER PUBLICATIONS

J. Spencer, "Using Tracer Techonology In Unconventional Wells", Hart Energy, May 1, 2015 (8 pages).
(Continued)

*Primary Examiner* — Andrew Sue-Ako
(74) *Attorney, Agent, or Firm* — Osha Bergman Watanabe & Burton LLP

(57) ABSTRACT

A method for monitoring gas production in a subterranean formation includes introducing a polymer composite particle having a degradable portion and a non-degradable portion including a tracer into a stimulation fluid and injecting the stimulation fluid into the subterranean formation to a treatment stage of a treatment zone. The treatment stage has at least one opening that the polymer composite particle may flow into and remain inside. The polymer composite particle may be exposed to moisture at a downhole temperature while inside the at least one opening. The moisture may degrade the degradable portion of the polymer composite particle, thereby releasing the non-degradable portion including the tracer. Produced gas that includes the non-degradable portion including the tracer may be recovered from the subterranean formation and the tracer may be correlated to the treatment stage of the treatment zone of the subterranean formation.

10 Claims, 4 Drawing Sheets

(51) Int. Cl.
*C09K 8/88* (2006.01)
*E21B 43/267* (2006.01)

(56) References Cited

U.S. PATENT DOCUMENTS

| | | | |
|---|---|---|---|
| 6,645,769 | B2 | 11/2003 | Tayebi et al. |
| 6,799,634 | B2 | 10/2004 | Hartog et al. |
| 7,032,662 | B2 | 4/2006 | Malone et al. |
| 7,196,040 | B2 | 3/2007 | Heath et al. |
| 9,594,070 | B2 | 3/2017 | Rule et al. |
| 9,874,080 | B2 | 1/2018 | Gupta et al. |
| 9,926,591 | B2 | 3/2018 | McCann et al. |
| 10,030,508 | B2 | 7/2018 | Romer et al. |
| 10,208,559 | B2 | 2/2019 | Takahashi et al. |
| 10,400,159 | B2 | 9/2019 | Gupta |
| 10,413,966 | B2 | 9/2019 | Murugesan et al. |
| 10,895,148 | B2 | 1/2021 | Nyhavn et al. |
| 10,927,292 | B2 | 2/2021 | Borrell et al. |
| 10,961,443 | B2 | 3/2021 | Zhao |
| 10,961,445 | B2 * | 3/2021 | Ogle ............... C09K 8/88 |
| 11,286,418 | B2 | 3/2022 | Duenckel et al. |
| 11,292,960 | B2 | 4/2022 | Planells et al. |
| 11,401,800 | B2 | 8/2022 | Tippit et al. |
| 11,414,974 | B2 | 8/2022 | Entchev et al. |
| 11,427,742 | B2 | 8/2022 | AlJabri et al. |
| 11,447,693 | B2 | 9/2022 | Jenkins et al. |
| 2006/0166838 | A1 | 7/2006 | Collins et al. |
| 2011/0277996 | A1 | 11/2011 | Cullick et al. |
| 2013/0017610 | A1 * | 1/2013 | Roberts ............... E21B 47/11 436/27 |
| 2016/0237774 | A1 * | 8/2016 | Okura ............... E21B 33/12 |
| 2016/0272882 | A1 | 9/2016 | Stray et al. |
| 2018/0155597 | A1 | 6/2018 | Burns et al. |
| 2018/0306027 | A1 | 10/2018 | Sherman et al. |
| 2020/0024506 | A1 * | 1/2020 | Trudel ............... G01V 8/10 |
| 2021/0108123 | A1 * | 4/2021 | Jamison ............... C09K 8/518 |
| 2022/0017815 | A1 | 1/2022 | Mohanty et al. |
| 2022/0145168 | A1 | 5/2022 | Kersey |
| 2022/0276217 | A1 | 9/2022 | Schimmel et al. |
| 2023/0129848 | A1 | 4/2023 | Shi et al. |
| 2023/0141819 | A1 | 5/2023 | Wang et al. |
| 2023/0144199 | A1 | 5/2023 | Wang et al. |
| 2023/0174839 | A1 | 6/2023 | Solovyeva et al. |
| 2024/0035373 | A1 | 2/2024 | Gizzatov et al. |

OTHER PUBLICATIONS

S. Rashdan et al., "Effect of the preparation route, PEG and annealing on the phase stability of Fe3O4 nanoparticles and their magnetic properties", Journal of Experimental Nanoscience, vol. 8, No. 2, pp. 210-222, Published Online Aug. 4, 2011 (14 pages).

C. Gao et al., "Functionalized Polysaccharides as Transient Markers for Subsurface Monitoring," Energy Fuels, 2022, 36, 8, 4328-4338, Apr. 11, 2022 (11 pages).

D. Wong et al., "Intense Pulsed Light-Treated Near-Field Electrospun Nanofiber on a Quartz Tuning Fork for Multimodal Gas Sensors", ACS Applied Materials & Interfaces, 2020, 12, 21, 24308-24318, May 1, 2021 (30 pages).

A. Y. El Naggar et el., "Monitoring of trace chloride ions at different stages of the gas production process", Arabian Journal of Chemistry, vol. 8, Issue 1, pp. 15-24, Published Online Mar. 9, 2011 (10 pages).

Office Action issued in corresponding U.S. Appl. No. 18/651,517; dated Apr. 11, 2025 (27 pages).

Office Action issued in Saudi Arabian Application No. 123450046, mailed on May 25, 2025 (20 pages).

* cited by examiner

400 ─┐

402 Provide a stimulation fluid including a polymer composite tracer

404 Inject the stimulation fluid into a treatment stage of a treatment zone of a subterranean formation

406 Fractures/wormholes, that have a size sufficient to trap the polymer composite tracer, are formed in the treatment stage

408 The polymer composite tracer is exposed to a produced gas that includes moisture

410 Upon exposure to moisture, the degradable portion of the polymer composite tracer starts to degrade

412 The degradable portion degrades fully, and the non-degradable portion containing the tracer is released and aerosolizes

414 The aerosolized tracer travels with the produced gas to a surface of the subterranean formation

416 The aerosolized tracer is collected and correlated to the treatment stage of the treatment zone

FIG. 4

PARTIALLY DEGRADABLE PARTICULATES AS TIME-RELEASED TRACERS FOR ACIDIZED AND FRACTURED GAS WELLS

CROSS-REFERENCE TO RELATED APPLICATIONS

This Application is a Division of application Ser. No. 17/815,379 filed on Jul. 27, 2022, the contents of which are hereby incorporated herein by reference in their entirety.

BACKGROUND

In the oil and gas industry, tracers are used for monitoring, mapping and confirming the presence of hydrocarbons in place as well as the production of hydrocarbons from various zones of interest in a reservoir. For example, tracers are used for applications such as waterflood optimization, remaining oil saturation determination, fluid pathway identification, and inter-well connectivity determination. Nonetheless, tracer technology for produced gas monitoring is limited, especially after acidizing and fracturing jobs. Currently, special tools can be installed downhole to monitor gas production, however these tools are expensive and often provide signals that overlap with existing chemicals in the reservoir, making gas monitoring less accurate.

Volatile organic compounds produced from the subterranean formation contain trace amounts of a large spectrum of chemicals containing a wide range of functional groups. Accordingly, the use of chemical gas tracers is a challenge, and the state-of-the-art chemical tracers are based on expensive and/or toxic fluorinated or deuterated gaseous molecules that are not found naturally in the environment. Additionally, such tracers are present in the produced gas in trace amounts, making unambiguous detection and analysis difficult. As such, there exists a need for the development of cost-effective, environmentally friendly chemical tracers that may readily pinpoint gas production from a given zone in a reservoir in the oil and gas industry.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for monitoring gas production in a subterranean formation including introducing a polymer composite particle having a degradable portion and a non-degradable portion that includes a tracer into a stimulation fluid and injecting the stimulation fluid including the polymer composite particle into the subterranean formation to a treatment stage of a treatment zone. The treatment stage may have at least one opening that the polymer composite particle may flow into and remain inside. In the method, the polymer composite particle is maintained inside the at least one opening for an amount of time during which the polymer composite particle is exposed to moisture at a downhole temperature, wherein the moisture degrades the degradable portion of the polymer composite particle, thereby releasing the non-degradable portion including the tracer. Then, the method includes recovering produced gas from the subterranean formation, wherein the produced gas includes a gaseous phase from the treatment stage of the treatment zone of the subterranean formation and the non-degradable portion including the tracer, determining a presence of the non-degradable portion including the tracer in the produced gas, and correlating the presence of the non-degradable portion including the tracer to the treatment stage of the treatment zone of the subterranean formation.

In another aspect, embodiments disclosed herein relate to a method including extruding a degradable polymer and a non-degradable polymer including a tracer to provide a polymer composite and introducing the polymer composite into a stimulation fluid.

In yet another aspect, embodiments disclosed herein relate to a composition including a polymer composite particle that includes a degradable portion and a non-degradable portion including a tracer, and stimulation fluid.

Other aspects and advantages of the claimed subject matter will be apparent from the following description and the appended claims.

BRIEF DESCRIPTION OF DRAWINGS

FIG. 4 is a block flow diagram of a method for monitoring gas production from a subterranean formation using polymer composite particles in accordance with one or more embodiments of the present disclosure.

DETAILED DESCRIPTION

The present disclosure relates to compositions and methods for monitoring gas production from various zones of interest in a subterranean formation. Disclosed compositions include a polymer composite particle having a degradable portion, a non-degradable portion, and a tracer. The tracer may be encapsulated in the non-degradable portion. Methods disclosed herein may include injecting polymer composite particles into a subterranean formation with a stimulation fluid or after a stimulation fluid. Within the formation, the polymer composite particles may flow into and reside inside fractures, where, over time, the degradable portion may degrade, releasing the non-degradable portion encapsulating the tracer. The non-degradable portion may travel to the surface with the produced gas. Produced gas from the subterranean formation may be monitored for the presence of the non-degradable portion and the tracer. As such, compositions and methods in accordance with the present disclosure may provide accurate monitoring of gas production in subterranean formations.

Polymer Composite Tracer Composition

In one aspect, embodiments disclosed herein relate to compositions including a polymer composite particle and a stimulation fluid. Polymer composite particles in accordance with the present disclosure may include a degradable portion, a non-degradable portion, and a tracer. In one or more embodiments, the tracer is encapsulated in the non-degradable portion of the polymer composite particle.

Figure 1:
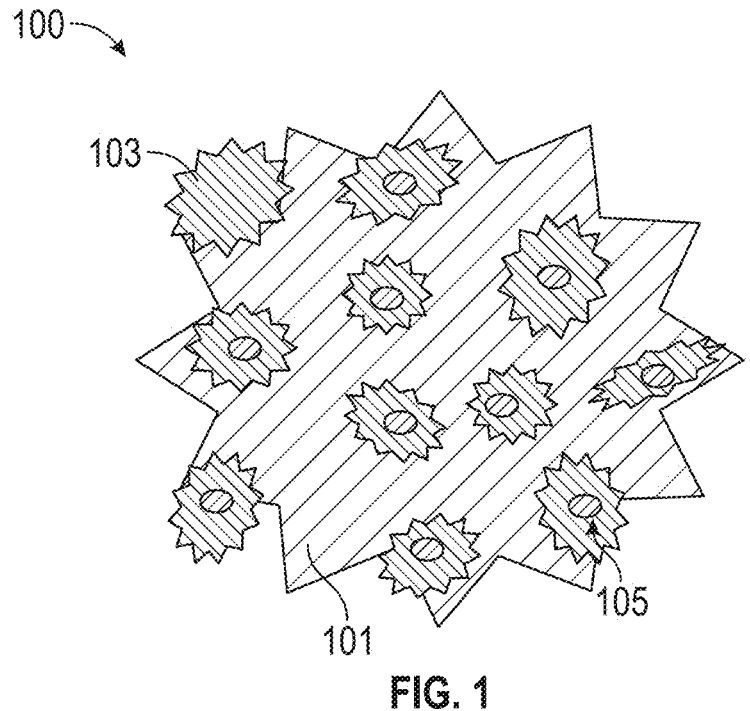
FIG. 1 is a schematic of a polymer composite particle according to one or more embodiments of the present disclosure.

A simplified depiction of a polymer composite particle of one or more embodiments is shown in FIG. 1. The polymer composite particle 100 has a degradable portion 101 and a non-degradable portion 103. The degradable portion 101 may be a degradable polymer. Herein, a degradable polymer refers to a polymer that has hydrolysable bonds in the backbone, and as such, may be hydrolyzed into monomers and/or oligomers in the presence of water and heat. Suitable degradable polymers include, but are not limited to, polyesters, polyester copolymers, polyamides, polyamide copolymers, polyurethanes, polyurethane copolymers, and combinations thereof. Copolymers may include two variations of the same type of polymer, or two different polymers. For example, a polyester copolymer may be a copolymer of polyester and modified polyester or a copolymer of polyester and polyurethane. For example, the degradable polymer of one or more embodiments may be a polyamide such as nylon, kevlar, nomax, polyamide-imides, and polyphthalamide; a polyester such as polylactic acid, polyglycolic acid, polycaprolactone, polyarylates, polyethylene phtalate, polyethylene terephthalate, polybutylene terephthalate, polytrimethylene terephthalate and polyethylene naphthalate; and combinations thereof. In some embodiments, a water-soluble polymer may be used instead of a degradable polymer. A water-soluble polymer is a polymer that may not actually chemically degrade via hydrolysable bonds, but rather it readily dissolves in water and may achieve a similar result downhole as a degradable polymer. Such water-soluble polymers include polyvinyl alcohols, polyvinyl alcohol copolymers, and modified polyvinyl alcohols. In certain embodiments, the degradable portion may be a biodegradable polymer, i.e., a polymer that is deteriorated or degraded by a bacterial decomposition process into byproducts such as gases, water, biomass, and inorganic salts. For example, suitable degradable polymers may be polysaccharides, cellulose, starches, Nichigo G-polymers from Mitsubishi Chemical, among others.

In one or more embodiments, the degradable polymer may be included in the polymer composite particle in an amount ranging from 20 to 95 wt % (weight percent) based on the total weight of the polymer composite particle. For example, the polymer composite particle may include the degradable polymer in an amount having a lower limit of any of 20, 25, 30, 35, 40, 45, 50, 55, and 60 wt % and an upper limit of any of 50, 55, 60, 65, 70, 75, 80, 85, 90, and 95 wt %, where any lower limit may be paired with any mathematically compatible upper limit.

Polymer composite particle compositions of the present disclosure also include a non-degradable portion. The non-degradable portion may be a non-degradable polymer. Herein, a non-degradable polymer refers to a polymer that generally does not degrade in the presence of water/moisture and heat, such as under downhole conditions. For example, polymer composite particles may include non-degradable polymers such as polyethylene, polybutylene, ethylene-vinyl acetate, polystyrene, acrylonitrile butadiene styrene, polycarbonate, polyacrylonitrile-styrene-acrylic, acrylic polymers, poly(p-phenylene oxide) and combinations thereof.

In one or more embodiments, the non-degradable polymer may be included in the polymer composite particle in an amount ranging from 5 to 80 wt % based on the total weight of the polymer composite particle. For example, the polymer composite particle may include a non-degradable polymer in an amount having a lower limit of any of 5, 10, 15, 20, 25, 30, 35, and 40 wt % and an upper limit of any of 40, 45, 50, 55, 60, 65, 70, 75, and 80 wt %, where any lower limit may be paired with any mathematically compatible upper limit.

In some embodiments, a degradable polymer and a non-degradable polymer may be combined as separate components, to provide an immiscible binary polymer blend. Such blends include two different types of polymers that do not mix with each other, but instead exist as separate components in one polymer composite particle. Immiscible binary polymer blends may be made of at least one degradable polymer and at least one non-degradable polymer, as described above. For example, polymer composite tracers may include immiscible polymer blends such as nylon/polypropylene (PP) blends, nylon/polyethylene (PE) blends, nylon/acrylonitrile butadiene styrene blends (ABS), polylactic acid/polystyrene blends, polylactic acid/ABS blends, polylactic acid/PP blends, polylactic acid/PE blends, polyethylene terephthalate (PET)/PE blends, PET/PP blends, polybutylene terephthalate (PBT)/PP blends, PBT/PE blends, PBT/ethylene-vinyl acetate (EVA) blends, PBT/polyacrylonitrile-styrene-acrylic (ASA) blends, among others. In one or more particular embodiments, the immiscible polymer blend may be a polyamide/polyester blend or a polyamide/polystyrene blend.

Rather than using separate degradable and non-degradable components to make an immiscible polymer blend, polymer composite particles of one or more embodiments may include a degradable/non-degradable block copolymer, meaning a block copolymer in which one block is degradable and one block is non-degradable. Suitable block copolymers may be thermoplastic copolyesters (TPC), thermoplastic polyurethane elastomers (TPU), and thermoplastic polyamides (TPA), among others. Thermoplastic copolyesters, for example, consist of a degradable amorphous phase and a non-degradable crystalline phase. Under downhole conditions (e.g., moisture and high temperature), the amorphous phase may degrade, leaving the crystalline phase intact. Examples of thermoplastic copolyesters that may be used in polymer composite tracer compositions disclosed herein include, but are not limited to, commercially available products such as DuPont™ Hytrel®, Celanese Pibiflex® TPC and Riteflex® (TPC-ET), DSM's Arnitel®. Similarly, thermoplastic polyurethane elastomers consist of alternating sequences of "hard" (i.e., non-degradable) and "soft" (i.e., degradable) domains formed by the reaction of diisocyanates and various diols. Commercially available TPU examples include, but are not limited to, BASF's Elastollan®, Bayer's Texin®, Teknorapex's Desmoflex®, Covestro's Desmopan®, Lubrizol's Carbothane™, Isoplast® ETPU, Tecoflex®, Tecophilic®, Tecoplast®, Tecothane®, EstaGrip®, Estaloc®, and Estane®. Thermoplastic polyamides such as commercially available Pebax® from Arkema, may also be used as degradable/non-degradable block copolymers in polymer composite tracers disclosed herein.

Regardless of the formulation, a non-degradable polymer and a degradable polymer are present in polymer composite particles of the present disclosure as discreet domains, as shown in FIG. 1. The degradable polymer may make-up a continuous polymer domain of the polymer composite particle. On the other hand, the non-degradable polymer may be included in polymer composite particles as smaller, noncontinuous domains. The noncontinuous domains may be thought of as smaller "particles" in the larger polymer composite particle. The noncontinuous domains of the non-degradable polymer may include a tracer 105. In one or more embodiments, the tracer may be dispersed throughout the non-degradable polymer domain of polymer composite particle. Such compartmentalization of the tracer 105 in the non-degradable domains may be achieved by the preparation method of the polymer composite particles. For example, the tracer may first be introduced into the non-degradable polymer to form a tracer masterbatch via compounding. Then, the tracer masterbatch may be mixed with the degradable polymer via compounding and extrusion to disperse the non-degradable polymer including tracers in the degradable polymer matrix. Any type of detectable tracer may be used. For example, tracers that are visible or detectable by fluorescence, UV-vis, FTIR, X-ray fluorescence (XRF), or GCMS may be included in polymer composite particle compositions. In one or more particular embodiments, the tracer is an optical tracer. The optical tracer may be a dye detectable by fluorescence and/or UV-vis spectroscopy such as tetrachloroisoindolinone orange, perylene red, quinacridone red, phthalocyanine blue, phthalocyanine green, disazo diarylide yellows, among others. In other embodiments, the tracer is a tracer detectable by other methods. For example, suitable FTIR and GCMS detectable tracers include, but are not limited to, polychloroethylene, polybromostyrene, polyfluorostyrene, and combinations thereof. Similarly, metal complexes that are detectable by XRF such as oxides including $ZnO$, $Fe_2O_3$, $Co_2O_3$, $Ni_2O_3$, $Cr_{2O3}$, $CuO$, $MnO_x$, $ZrO_2$, $TiO_2$, or sulfides including $ZnS$, $Ce_2S_3$, and any combinations thereof, may be used as tracers in polymer composite particles of one or more embodiments.

In one or more embodiments, the tracer may be present in the polymer composite tracer composition in an amount ranging from 0.0005 to 50 wt % based on the total weight of the polymer composite particle composition. For example, polymer composite particle compositions may include a tracer in an amount having a lower limit of any of 0.0005, 0.001, 0.002, 0.005, 0.01, 0.02, 0.03, 0.04, 0.05, and 0.1 wt % and an upper limit of any of 0.1, 0.5, 1.0, 5.0, 10, 15, 20, 25, 30, 35, 40, 45, and 50 wt %, where any lower limit may be paired with any mathematically compatible upper limit.

As previously described, in one or more embodiments, the tracer may be encapsulated in the non-degradable polymer. In such embodiments, the non-degradable polymer containing the tracer may have an average particle diameter ranging from about 100 nm to 300 microns. For example, the non-degradable polymer including the tracer may have an average diameter ranging from a lower limit of any of 100, 200, 400, 500, 600, 700, 800, 900 and 1,000 nm to an upper limit of any of 120, 150, 175, 200, 225, 250, 275, and 300 microns, where any lower limit may be paired with any mathematically compatible upper limit.

As described above, the non-degradable polymer encapsulating a tracer may be mixed with a degradable polymer to provide a polymer composite particle in accordance with the present disclosure. As such, polymer composite particles may be significantly larger than the non-degradable portion. Polymer composite particles may have an average particle size ranging from 10 microns to 10 mm (millimeters). In one or more embodiments, polymer composite tracers may have an average particle size having a lower limit of any of 10, 20, 30, 40, 50, 60, 70, 80, 90, and 100 microns to an upper limit of any of 1, 2, 3, 4, 5, 6, 7, 8, 9, and 10 mm (millimeters), where any lower limit may be paired with any mathematically compatible upper limit.

Polymer composite particles in accordance with the present disclosure may be designed to have properties that enable the polymer composite particles to flow into and remain inside openings in the rock matrix of a subterranean formation. Such properties include size, as described above, aspect ratio, and physical structure, among others. Polymer composite particles may have an aspect ratio ranging from 1 to 500. For example, polymer composite particles in one or more embodiments may have an aspect ratio having a lower limit of any of 1, 2, 5, 8, 10, 15, 20, 25, 40, 50, 75, and 100 and an upper limit of any of 75, 100, 150, 200, 250, 300, 350, 400, 450, and 500, where any lower limit may be paired with any mathematically compatible upper limit. Polymer composite particles having an aspect ratio above 100 may have a shape similar to a fiber, whereas polymer composite tracers having an aspect ratio below 50 may have a shape similar to a sphere. In one or more embodiments, polymer composite particles having an aspect ratio greater than 500 may be capable of bridging the wormholes/fractures in the formation. Herein, "bridging" refers to the ability of a particle to lodge inside a wormhole/fracture of the subterranean formation, such that it may remain in place until the degradable polymer degrades, thus releasing the non-degradable polymer with the tracer. Such "bridging" of a wormhole/fracture may be important to achieving the desired time-release of the tracers. Furthermore, the physical structure of polymer composite particles is an important property in compositions of the present disclosure. Polymer composite particles having a large particle size distribution (i.e., a mixture of particles with different sizes) may be suitable for remaining inside the wormholes/fractures of a subterranean formation. For example, particles having different diameters may pack into wormholes/fractures more efficiently given that the wormholes/fractures are not of uniform size from start to finish. As such, a greater concentration of particles may be spread across an entire wormhole or fracture.

Method for Preparing Polymer Composite Tracers

Figure 2:
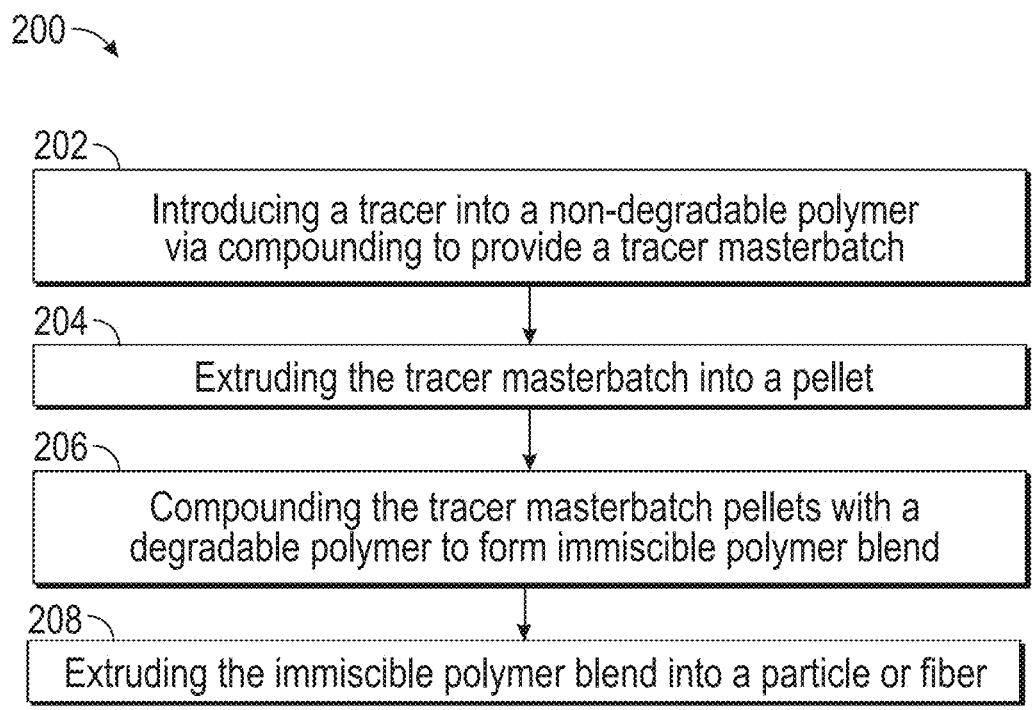
FIG. 2 is a block flow diagram of a method for preparing a polymer composite in accordance with one or more embodiments of the present disclosure.

One or more embodiments of the present disclosure relate to a method for preparing the previously described polymer composite particle composition. An exemplary method 200 is shown in FIG. 2. Method 200 may first include introducing a tracer into a non-degradable polymer via compounding to provide a tracer masterbatch 202. The tracer and non-degradable portion may be appropriately chosen based upon the polymer composite particle that is being made and are as previously described. Compounding of the tracer into the non-degradable polymer may be done at an elevated temperature using a single or twin-screw extruder, for example. After compounding, the tracer masterbatch may be extruded into a pellet form 204.

Method 200 may then include compounding the pellets of the tracer masterbatch with a degradable polymer to form an immiscible polymer blend 206. The degradable polymer is as previously described. The degradable polymer and the pellets may be compounded at an elevated temperature. Any suitable elevated temperature may be used, provided that it is above the melting points, and below the thermal degradation points, of both the degradable and non-degradable polymers. Finally, the immiscible polymer blend may be processed via extrusion to form pellets or particles, or via a melt-spin process to form fibers with domains of non-degradable polymer dispersed throughout the degradable polymer matrix 208. According to this preparation method, the tracer may be trapped inside the non-degradable portion of the polymer composite particles.

Stimulation Fluid Composition

Polymer composite particles as previously described may be added to a stimulation fluid to provide a stimulation fluid composition. The disclosed polymer composite particles may be suitable for use in any stimulation fluid. In one or more embodiments, the stimulation fluid is an acidizing fluid, an organic acid, a fracturing fluid, a hydraulic fracturing fluid, an emulsified acid, a viscoelastic surfactant, a foamed fluid, a linear gel, and a crosslinked gel, among others. In particular embodiments, polymer composite particles are added to acidizing fluid or hydraulic fracturing fluid.

One or more embodiments of the stimulation fluid include an aqueous-based fluid. The aqueous-based fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the operation of the stimulation fluid.

In one or more embodiments, the stimulation fluid may contain water in a range of from about 50 wt % to 97 wt % based on the total weight of the stimulation fluid. In one or more embodiments, the stimulation fluid may comprise greater than 70 wt % water based on the total weight of the stimulation fluid.

In some embodiments, the stimulation fluid may incorporate an acid in the aqueous-base fluid. The acid may be an inorganic acid, an organic acid, or both. The inorganic acid may include, but are not limited to, HCl, nitric acid, hydrofluoric acid, hydrobromic acid, perchloric acid, hydroiodic acid, fluoroboric acid, or derivatives, and mixtures thereof. In particular embodiments, the stimulation fluid includes HCl. Suitable organic acids include, but are not limited to, alkanesulfonic acids, arylsulfonic acids, formic acid, acetic acid, methanesulfonic acid, p-toluenesulfonic acid, alkyl carboxylic acids, aryl carboxylic acids, lactic acid, glycolic acid, malonic acid, fumaric acid, citric acid, tartaric acid, chloroacetic acid, dichloroacetic acid, trichloroacetic acid, fluoroacetic acid, difluoroacetic acid, trifluoroacetic acid, glutamic acid diacetic acid, methylglycindiacetic acid, 4,5-imidazoledicarboxylic acid, and combinations thereof. Acid-generating systems may include esters and/or formates that are water soluble or partially water soluble. Suitable acid-generating compounds may include esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, and combinations thereof. Exemplary acid-generating compounds include lactic acid derivatives, methyl lactate, ethyl lactate, propyl lactate, and butyl lactate. In some embodiments, the acid-generating compound is a formate ester including, but not limited to, ethylene glycol monoformate, ethylene glycol diformate, diethylene glycol diformate, glyceryl monoformate, glyceryl diformate, glyceryl triformate, triethylene glycol diformate, and formate esters of pentaerythritol. In certain embodiments, the acid-generating compound is ethylene glycol monoformate or diethylene glycol diformate. In some embodiments, the acid-generating compound is a nitrile-containing compound. In some embodiments, the acid-generating compound is an ester, for instance, polyesters of glycerol including, but not limited to, tripropionin (a triester of propionic acid and glycerol), trilactin, and esters of acetic acid and glycerol such as monoacetin, diacetin, and triacetin. Other suitable esters include aliphatic polyesters, poly(lactides), poly(glycolides, poly(E-caprolactones), poly(hydroxybutyrates), poly(anhydrides), aliphatic polycarbonates, poly(amino acids), and polyphosphazenes, or copolymers thereof, or derivatives and combinations thereof. These acid-producing systems may provide the corresponding acids when hydrolyzed in the presence of water.

The acid may be present in an aqueous-based fluid at a concentration ranging from about 5 wt % to about 35 wt %. For example, the aqueous-base fluid may have an acid in an amount having a lower limit of any of 5, 7, 10, 12, 15, and 20 wt % and an upper limit of any of 15, 20, 22, 25, 27, 30, 32, and 35 wt %, where any lower limit may be paired with any mathematically compatible upper limit. In one or more particular embodiments, the stimulation fluid is an acidizing fluid including about 28 wt % of HCl.

In one or more embodiments, the stimulation fluid includes a suitable amount of a polymer composite particle. The amount of polymer composite particle may be adjusted depending on the type of tracer included in the polymer composite particle. In one or more embodiments, the stimulation fluid may include from 0.2 to 10 lbm/gal (pound-mass per thousand gallon) of the polymer composite particle relative to the total amount of stimulation fluid. For example, the stimulation fluid may include a polymer composite particle in an amount having a lower limit of any of 0.2, 0.3, 0.5, 1.0, 1.5, 2.0, 2.5, 3.0, 3.5, 4.0, and 4.5 lbm/gal and an upper limit of any of 5.0, 5.5, 6.0, 6.5, 7.0, 7.5, 8.0, 8.5, 9.0, 9.5, and 10 lbm/gal, where any lower limit may be paired with any mathematically compatible upper limit.

In one or more embodiments, when the stimulation fluid is a hydraulic fracturing fluid, the hydraulic fracturing fluid includes a proppant. Proppants are often included in stimulation fluids to help keep fractures open and capable of supporting the flow of hydrocarbons from a subterranean formation to a wellbore. Such proppants may include gravel, sand, bauxite, or glass beads. Any type of proppant may be added to the stimulation fluid. Suitable proppants may have a size ranging from 200 to 8 mesh. In some embodiments, the proppant may be coated with the polymer composite particle. In other embodiments, the proppant may be mixed with the polymer composite particle to provide a proppant/particle mixture that includes the polymer composite particle in an amount ranging from 1.0 to 100 wt %, relative to the weight of the proppant. In such a proppant/particle mixture, the polymer composite particle may be present in an amount having a lower limit of any of 1.0, 1.5, 2.0, 2.5, 3.0, 3.5, 4.0, 4.5, and 5.0 wt % and an upper limit of any of 10, 20, 30, 40, 50, 60, 70, 80, 90, and 100 wt %, where any lower limit may be paired with any mathematically compatible upper limit.

In one or more embodiments, the stimulation fluid may optionally include additional additives. Examples of such additional additives may include, but are not limited to, emulsifiers, friction reducers, fibers, oxidizing agents, lost circulation materials, scale inhibitors, surfactants, clay stabilizers, corrosion inhibitors, paraffin inhibitors, asphaltene inhibitors, penetrating agents, clay control additives, iron control additives, reducers, oxygen scavengers, sulfide scavengers, foamers, gases, derivatives thereof, and combinations thereof.

Method for Monitoring Produced Gas

In another aspect, embodiments disclosed herein relate to a method for monitoring gas production of a subterranean formation using the previously described polymer composite particle composition.

Figure 3:
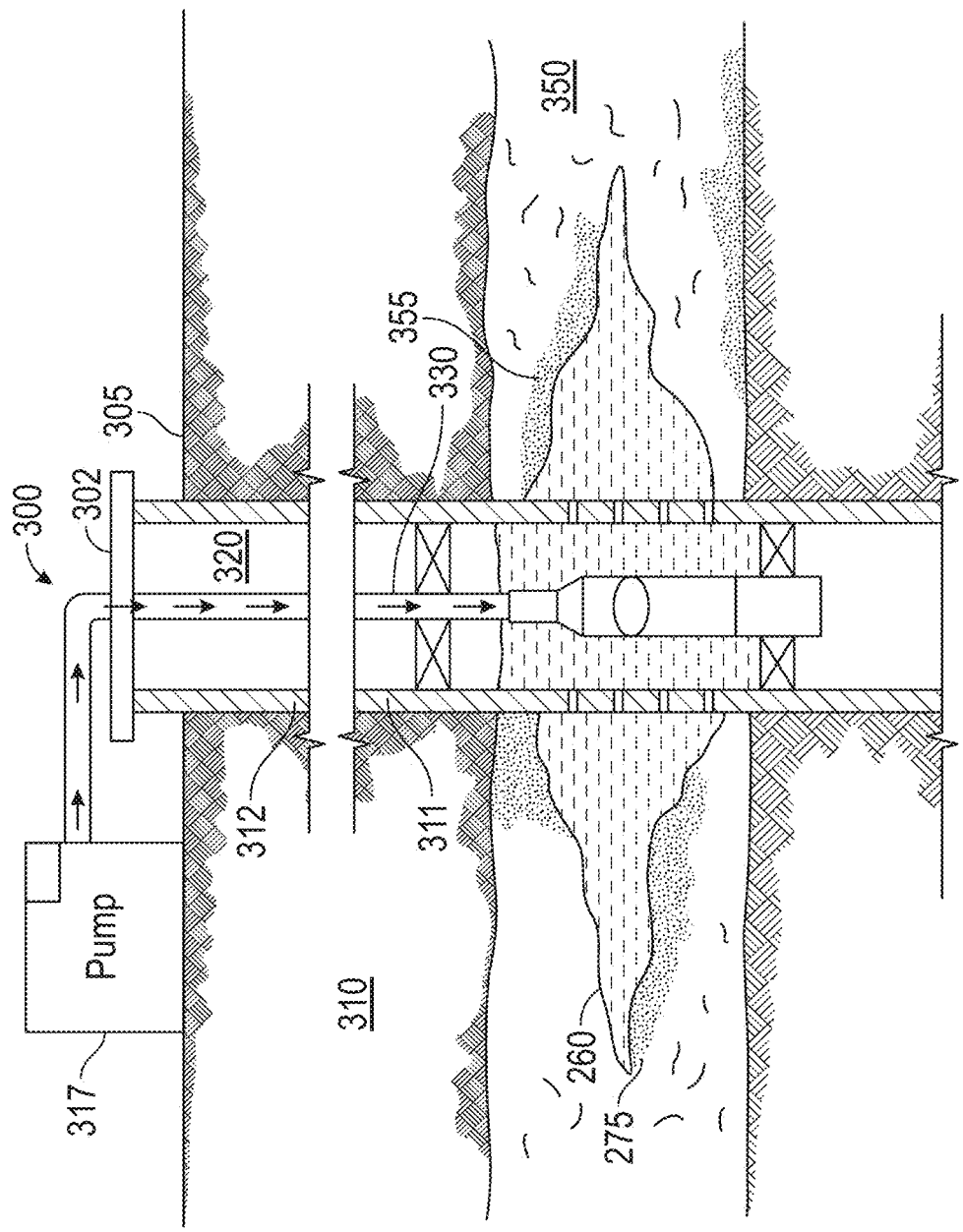
FIG. 3 is a depiction of a well environment according to one or more embodiments of the present disclosure.

FIG. 3 is a diagram that illustrates a well environment 300 in accordance with one or more embodiments of the present disclosure. Well environment 300 includes a surface 305 and a subsurface 310. Subsurface 310 is depicted having a wellbore wall 311 both extending downhole from a surface 305 into the subsurface 310 and defining a wellbore 320. The well environment includes a well head 302 at the surface 305. The subsurface also includes subterranean formation 350 in which the stimulation fluid is injected and subsequently, the gas production is monitored. Subterranean formation 350 has subterranean formation face 355 that fluidly couples subterranean formation 350 with wellbore 320 through wellbore wall 311. In this case, casing 312 extends downhole through the wellbore 320 into the subsurface 310 and towards subterranean formation 350.

With the configuration in FIG. 3, the previously described stimulation fluid composition including a polymer composite particle may be introduced into the subsurface 310 and towards subterranean formation 350 via a pump 317 through valves located in the well head and down the work string 330. The stimulation fluid may generate a fracture 260 in the rock 275 of the subterranean formation 350. As noted above, polymer composite particles may become lodged in openings in the fracture 260. Hydrocarbon-bearing formations may include any oleaginous fluid, such as crude oil, dry gas, wet gas, gas condensates, light hydrocarbon liquids, tars, and asphalts, and other hydrocarbon materials. Hydrocarbon-bearing formations may also include aqueous fluid, such as water and brines. Embodiment polymer composite particle compositions may be appropriate for use in different types of subterranean formations, such as carbonate, dolomite, shale, sandstone and tar sands.

A method for monitoring gas production from a reservoir in subterranean formation 350 in accordance with one or more embodiments is shown in and discussed with reference to FIG. 4. Method 400 includes providing a stimulation fluid including a polymer composite particle 402. The polymer composite particle is as previously described. The stimulation fluid may then be injected into a treatment zone of the subterranean formation through the wellbore 404. In the treatment zone, there may be multiple treatment stages. The stimulation fluid may be injected into a specific treatment stage of the treatment zone. Upon injection into the treatment stage of the treatment zone, the stimulation fluid may induce the development of small fractures/wormholes in the subterranean formation 406. The polymer composite particles may flow into the formed fractures/wormholes with the stimulation fluid and subsequently remain inside the formed fracture/wormholes once the stimulation fluid has been depleted 406. Polymer composite particles may be tailored to have properties, such as morphology/shape, size, and aspect ratio, that provide for the "trapping" of the polymer composite particle in the fractures/wormholes of the subterranean formation.

After being trapped in the fractures/wormholes of the subterranean formation at the treatment stage for an amount of time, the polymer composite particle may be exposed to moisture from the reservoir 408. Upon exposure to moisture at an elevated downhole temperature, the hydrolyzable bonds of the degradable polymer may be hydrolyzed, and the degradable portion may begin to degrade 410. Alternatively, if the degradable portion is a water-soluble polymer, the polymer may be dissolved in the moisture at the elevated downhole temperature. Depending on the moisture content and the downhole temperature of the treatment zone, degradation of the degradable portion of the polymer composite particle may occur in one day or over several weeks to months. The treatment zone may have a downhole temperature ranging from 70° C. to 150° ° C. Complete degradation of the degradable portion of the polymer composite particle may take an amount of time having a lower limit of any of 1, 2, 3, 4, 5, 6, and 7 days and an upper limit of any of 2, 4, 6, 8, 10, and 12 weeks, where any lower limit may be paired with any mathematically compatible upper limit.

After at least some degradation of the degradable portion, the non-degradable portion including the tracer may be released 412. The non-degradable portion may be selected based on size and composition so that it may be carried to the surface of the subterranean formation with a gaseous phase 414. At the surface, the non-degradable portion encapsulating the tracer may be collected, analyzed, and correlated to the treatment stage of the treatment zone in the target formation 416. The non-degradable portion including the tracer may be collected via any device known in the art such as an environmental air sampler or a gas-permeable membrane filter. Any method suitable for analysis of the tracer may be used to analyze the tracer including, but not limited to, fluorescence spectroscopy, microscopy, UV-Vis spectroscopy, FTIR spectroscopy, Raman spectroscopy, GCMS, pyrolysis GCMS, X-ray fluorescence, inductively coupled plasma optical emission spectroscopy (ICP-OES), inductively coupled plasma mass spectrometry (ICP-MS), and optical imaging. The results of the analysis can be used to monitor which stage or zone is producing gas as a function of time after a stimulation operation.

As described above, a given treatment zone of a subterranean formation may have multiple treatment stages. Likewise, a given subterranean formation may have multiple treatment zones. In some embodiments, a formation may have anywhere from two to 80 treatment zones. Accordingly, stimulation fluids including distinct polymer composite particles may be injected into different treatment stages of a treatment zone, and different treatment zones of a subterranean formation. For example, in one or more embodiments, methods may include injecting a first stimulation fluid including a first polymer composite particle into a first treatment stage of a treatment zone. Then, a second stimulation fluid including a second polymer composite particle may be injected into a second treatment stage of the treatment zone. The number of different stimulation fluids including distinct polymer composite particles that may be injected into the same treatment zone or the same subterranean formation is not particularly limited. In some embodiments, up to 80 different stimulation fluid including distinct polymer composite particles may be injected in up to 80 different treatment stages of a treatment zone. In methods in which multiple different polymer composite particles are injected and remain inside fractures/wormholes of multiple different treatment stages, the produced gas may include one or more tracers from the different polymer composite particle. Such methods may provide more accurate gas production monitoring as the origin of produced gas may be more readily determined.

Embodiments of the present disclosure may offer at least the following advantages. Use of the disclosed polymer composite particles in methods herein may provide for the confirmation of gas production from stimulated zones of a formation, according to various stimulated stage or stages based on the chemical fingerprint of the tracer at the surface. Additionally, polymer composite particles of one or more embodiments may offer a time-released tracer, that may reside in the wormholes or fractures of a formation for weeks to months, staying intact.

EXAMPLES

Rhodamine B is a zwitterionic aromatic dye supplied by Beantown Chemical. Polystyrene particles (200 nm) containing Rhodamine B dye were synthesized via emulsion polymerization of styrene dispersed in an aqueous solution of Rhodamine B dye and a surfactant, sodium dodecyl sulfate (SDS). An Indiana limestone core plug was collected from an outcrop sample.

Example 1: Submicron Particle Transport Experiment

A laboratory experiment to demonstrate submicron particle transport (i.e., the non-degradable portion of the polymer composite particle comprising the tracer) through wormholes in a subterranean formation after acid stimulation was completed under ambient temperature and pressure conditions using an in-house microfluidic device. Details of the microfluidic device may be found in U.S. patent application Ser. No. 17/157,256, which is incorporated by reference herein in its entirety. The microfluidic device had dimensions such that it can house a discoidal rock sample with a thickness of 1-15 mm and diameter up to 3.8 cm. The discoidal rock may be sandwiched between two plain surfaces, one of which is transparent. The device has two injected/production ports, one on the bottom middle and one on the side. The ports permit the injection and production of fluids through the porous rock structure.

Figure 5:
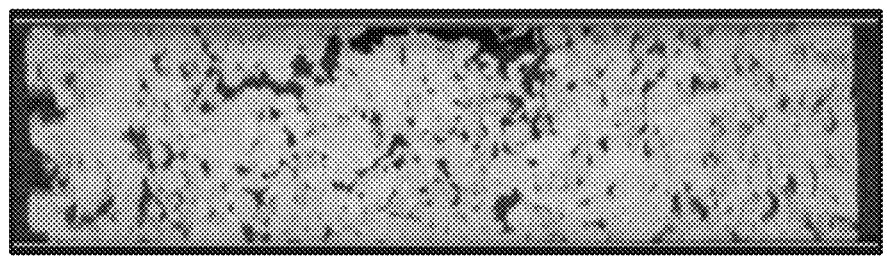
FIG. 5 is a photograph of a computed tomography scan of a cross section of a limestone core plug that has been treated with an acid mixture.

A disk-shaped Indiana limestone core plug measuring 38 mm in diameter and 10 mm in thickness with a permeability of from 200 to 300 mD was used in Example 1. The core plug was saturated with deionized (DI) water and treated with a low-viscosity retarded acid system comprising a strong mineral acid (HCl) and a weak organic acid (methanesulfonic acid). The acid mixture was injected into the middle of the disk-shaped core plug using an injection port of the microfluidic device, resulting in the formation of wormholes. FIG. 5 shows a cross section of a computed tomography (CT) scan of the acidized core plug to illustrates the formed wormholes. Then, the core plug was placed in an injection device, and flooded with an aqueous-based tracer solution including the Rhodamine B dye loaded polystyrene particles and an aqueous phase from one side.

Figure 6:
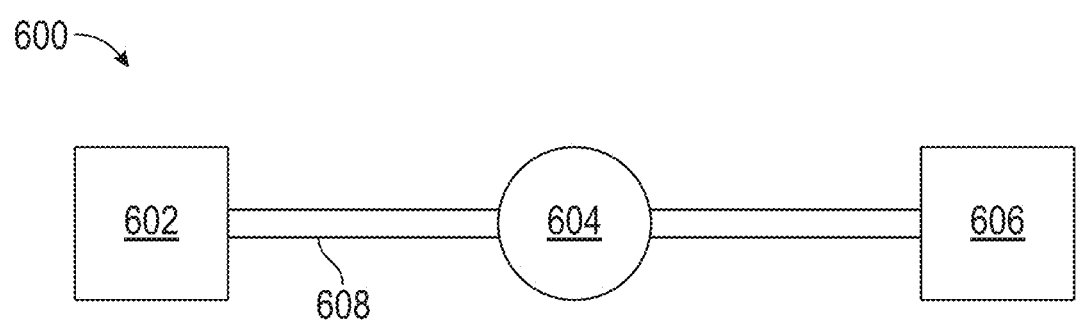
FIG. 6 is a depiction of a microfluidic device used in laboratory experiments in accordance with the present disclosure.

FIG. 6 is a depiction of an in-house microfluidic device 600 used for the submicron particle transport experiment. The core plug including the tracer solution was placed into the metal housing 604 of the microfluidic device 600. A mass flow controller 602, disposed upstream of the core plug in the metal housing 604 was used to control the flow of $N_2$ gas through the gas flow line 608 into the core plug. The gas was injected into the core plug on a side opposite to the one side that the tracer was injected into, so as to mimic the gas flow direction in a reservoir. After flowing through the metal housing, the $N_2$ gas continued through the gas flow line 608 into a filter holder 606. A filter having a suitable size that enabled the flow of gas through the filter but restricted the flow of tracer particles was installed in the filter holder 606 after 5 minutes of continuous gas flow through the metal housing 604. A filter having pores ranging from 100 to 200 nm was be used to collect particles having a size of 240 nm in the present experiment. After 1 hour of continuous gas flow, the filter was analyzed under UV light (365 nm) for the presence of the Rhodamine B loaded polystyrene particles. Both filters show the presence of Rhodamine B loaded polystyrene particles.

Example 2: Degradation Experiment

Figures 7A, 7B:
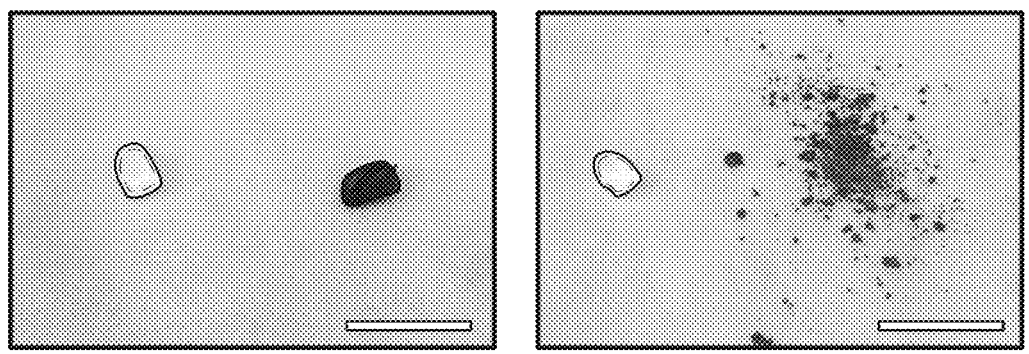
FIG. 7A is a photograph of a polymer composite particle before heating (left) and after heating at 150° C. in at least 98% humidity for 6 days (right) in accordance with one or more embodiments.
FIG. 7B is a photograph of a polymer composite particle before heating (left) and after heating at 150° C. in at least 98% humidity for 6 days and then being exposed to a pressure of 30 to 50 PSI (right) in accordance with one or more embodiments.

An experiment to demonstrate the degradation of the degradable portion of a polymer matrix after an amount of time under reservoir conditions was conducted. Zythane® 4070D polyester based thermoplastic polyurethane (TPU) bead with a density of 1.23 g/cm$^3$, hardness of 70 Shore D, tensile strength at break of 6235 PSI (pounds per square inch) and melting point around 220° C. was supplied by APS Elastomers. The Zythane® 4070D polyester based thermoplastic polyurethane (TPU) sample was placed into an enclosed pressure vessel with about 98% humidity, heated to 150° C., and left for aging in an air In FIG. 7A, the Zythane® 4070D before aging is shown on the left as an opaque bead. After heating the bead in an enclosed pressure vessel in about 98% humidity at 150° C. for 8 days, it turned black, as shown on the right. FIG. 7B shows the same aged Zythane® 4070D sample after being exposed to an applied pressure of less than 50 PSI (pound per square inch). In FIGS. 7A and 7B, the degradation of the "soft" (i.e., degradable) portion of the Zythane® 4070D polymer is shown, which then leaves a water-insoluble, micron sized powder material (i.e., the non-degradable portion) that can be transported to the surface from a gas producing reservoir with the flow of produced gas.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for monitoring gas production in a subterranean formation comprising:
    introducing a polymer composite particle having a degradable portion and a non-degradable portion into a stimulation fluid,
        wherein the non-degradable portion comprises a tracer,
        wherein the degradable portion comprises a polymer that has hydrolysable bonds in the backbone,
        wherein the polymer composite particle is a block copolymer wherein one block of the block copolymer is the degradable portion and one block of the block copolymer is the non-degradable portion, and wherein the block copolymer is selected from the group consisting of thermoplastic copolyesters (TPC), thermoplastic polyurethane elastomers (TPU), and thermoplastic polyamides (TPA);

injecting the stimulation fluid comprising the polymer composite particle into the subterranean formation to a treatment stage of a treatment zone comprising at least one opening, wherein the polymer composite particle flows into and remains inside the at least one opening;

maintaining the polymer composite particle inside the at least one opening for an amount of time during which the polymer composite particle is exposed to moisture at a downhole temperature, wherein the moisture degrades the degradable portion of the polymer composite particle, thereby releasing the non-degradable portion comprising the tracer;

recovering produced gas from the subterranean formation, wherein the produced gas comprises a gaseous phase from the treatment stage of the treatment zone of the subterranean formation and the non-degradable portion comprising the tracer;

determining a presence of the non-degradable portion comprising the tracer in the produced gas; and correlating the presence of the non-degradable portion comprising the tracer to the treatment stage of the treatment zone of the subterranean formation.

2. The method of claim 1, further comprising:

injecting a second stimulation fluid comprising a second polymer composite particle having a degradable portion and a non-degradable portion comprising a second tracer into the subterranean formation to a second treatment stage of the treatment zone comprising at least one opening, wherein the second polymer composite particle flows into and remains inside the at least one opening;

maintaining the second polymer composite particle inside the at least one opening of the second treatment stage for an amount of time during which the second polymer composite particle is exposed to moisture at a downhole temperature, wherein the moisture degrades the degradable portion of the second polymer composite particle, thereby releasing the non-degradable portion comprising the second tracer;

detecting a presence of the non-degradable portion comprising the second tracer in the produced gas; and correlating the presence of the non-degradable portion comprising the second tracer to the second treatment stage of the treatment zone.

3. The method of claim 1, wherein the tracer is selected from the group consisting of tetrachloroisoindolinone orange, perylene red, quinacridone red, phthalocyanine blue, phthalocyanine green, disazo diarylide yellows, and combinations thereof.

4. The method of claim 1, wherein the tracer is selected from the group consisting of ZnO, $Fe_2O_3$, $Co_2O_3$, $Ni_2O_3$, $Cr_2O_3$, CuO, $MnO_x$, $ZrO_2$, $TiO_2$, ZnS, $Ce_2S_3$, and combinations thereof.

5. The method of claim 1, wherein the polymer composite particle has an average particle size ranging from 10 microns to 10 millimeters.

6. The method of claim 1, wherein the non-degradable portion of the polymer composite particle has an average particle size ranging from 100 nm to 300 microns.

7. The method of claim 1, wherein the stimulation fluid is selected from the group consisting of an acidizing fluid, an organic acid, a fracturing fluid, a hydraulic fracturing fluid, an emulsified acid, a viscoelastic surfactant, a foamed fluid, a linear gel, a crosslinked gel, and combinations thereof.

8. The method of claim 1, wherein the opening is a fracture, a wormhole, or a pore.

9. The method of claim 1, wherein the amount of time is from 1 week to 12 weeks.

10. The method of claim 1, wherein the subterranean formation comprises up to 80 treatment stages and wherein the method further comprises:

injecting a stimulation fluid comprising a distinct polymer composite particle having a degradable portion and a non-degradable portion comprising a distinct tracer into the subterranean formation at each treatment stage, such that up to 80 distinct polymer composite particles are injected into the subterranean formation, wherein each treatment stage comprises at least one opening and wherein each distinct polymer composite particle flows into and remains inside the at least one opening;

maintaining each of the up to 80 distinct polymer composite particles inside the at least one opening of each treatment stage for an amount of time during which each distinct polymer composite particle is exposed to moisture at a downhole temperature, wherein the moisture degrades the degradable portion of each distinct polymer composite particles, thereby releasing the non-degradable portion comprising the distinct tracer, such that up to 80 non-degradable portions, each comprising a distinct tracer are released at the same or different times;

detecting a presence of the distinct tracer of each of the up to 80 non-degradable portions in the produced gas; and correlating the presence of the distinct tracer of each of the up to 80 non-degradable portions to one of the up to 80 treatment stages of the subterranean formation.

* * * * *